(12) United States Patent
He et al.

(10) Patent No.: US 8,516,804 B2
(45) Date of Patent: Aug. 27, 2013

(54) SYSTEMS AND METHODS FOR DETERMINING A PARTICULATE LOAD IN A PARTICULATE FILTER

(75) Inventors: Suhao He, Painted Post, NY (US); Achim Karl-Erich Heibel, Corning, NY (US); Pushkar Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 332 days.

(21) Appl. No.: 12/714,041

(22) Filed: Feb. 26, 2010

(65) Prior Publication Data
US 2011/0209460 A1 Sep. 1, 2011

(51) Int. Cl.
*F01N 3/18* (2006.01)

(52) U.S. Cl.
USPC ............. 60/295; 60/274; 60/276; 60/297; 60/311

(58) Field of Classification Search
USPC ................ 60/274, 276, 295, 297, 311
See application file for complete search history.

(56) References Cited

U.S. PATENT DOCUMENTS

| | | | |
|---|---|---|---|
| 5,110,747 A | 5/1992 | Pataschnick et al. | |
| 6,397,587 B1 | 6/2002 | van Nieuwstadt et al. | |
| 6,408,686 B1 | 6/2002 | Tallio et al. | |
| 6,941,750 B2 | 9/2005 | Boretto et al. | |
| 6,947,831 B2 | 9/2005 | van Nieuwstadt | |
| 7,017,338 B2 | 3/2006 | van Nieuwstadt | |
| 7,031,827 B2 | 4/2006 | Trudell et al. | |
| 7,065,960 B2 | 6/2006 | Gioannini et al. | |
| 7,243,489 B2 | 7/2007 | Johnson et al. | |
| 7,263,825 B1 | 9/2007 | Wills et al. | |
| 7,322,184 B2 | 1/2008 | Kondou et al. | |
| 7,484,357 B2 | 2/2009 | Dollmeyer et al. | |
| 2003/0196430 A1* | 10/2003 | Brown et al. | 60/297 |
| 2004/0159099 A1 | 8/2004 | Kuboshima et al. | 60/297 |
| 2004/0204818 A1* | 10/2004 | Trudell et al. | 701/114 |
| 2005/0138921 A1* | 6/2005 | Hashimoto et al. | 60/297 |
| 2007/0044459 A1 | 3/2007 | Kariya et al. | 60/295 |
| 2007/0068147 A1 | 3/2007 | Sun et al. | |
| 2007/0101697 A1* | 5/2007 | Yahata et al. | 60/277 |
| 2007/0240406 A1* | 10/2007 | Zhang et al. | 60/297 |
| 2008/0078236 A1 | 4/2008 | Mital et al. | |
| 2008/0149081 A1 | 6/2008 | Allain | |

(Continued)

FOREIGN PATENT DOCUMENTS

| | | |
|---|---|---|
| FR | 2 930 290 | 10/2009 |
| WO | 2010/021066 | 2/2010 |

OTHER PUBLICATIONS

U.S. Appl. No. 12/324,090, filed Nov. 26, 2008, He et al.
U.S. Appl. No. 12/324,001, filed Nov. 26, 2008, He et al.

(Continued)

*Primary Examiner* — Thomas Denion
*Assistant Examiner* — Jorge Leon, Jr.
(74) *Attorney, Agent, or Firm* — Matthew B. McNutt (57) ABSTRACT

A method for regenerating a particulate filter may comprise calculating a soot layer state correction factor based on a rate of regeneration and a rate of particulate loading in the particulate filter and calculating an estimated soot load in the particulate filter based on a pressure drop of an exhaust gas flowing through the particulate filter and the calculated soot layer state correction factor. The method for regenerating the particulate filter may further comprise causing regeneration of the particulate filter when the estimated soot load is greater than or equal to a threshold value.

27 Claims, 7 Drawing Sheets

(56) References Cited

U.S. PATENT DOCUMENTS

| | | |
|---|---|---|
| 2008/0184696 A1 | 8/2008 | Wyatt |
| 2009/0044514 A1* | 2/2009 | Brahma et al. ............... 60/274 |
| 2009/0056312 A1 | 3/2009 | Wills |
| 2009/0151330 A1* | 6/2009 | Chamarthi et al. ............ 60/286 |
| 2010/0139250 A1* | 6/2010 | Andersson et al. ............ 60/285 |
| 2010/0205943 A1* | 8/2010 | Gonze et al. ................... 60/286 |
| 2010/0223910 A1* | 9/2010 | Funk et al. ..................... 60/277 |
| 2011/0030346 A1* | 2/2011 | Neubauer et al. .............. 60/274 |

OTHER PUBLICATIONS

U.S. Appl. No. 12/625,049, filed Nov. 24, 2009, George et al.

S. England, C. Rutland, D. Foster, and Y. He., "Investigation of the Effect of DPF Loading and Passive Regeneration on Engine Performance and Emissions Using an Integrated System Simulation," 2006 SAE World Congress, Apr. 3-6, 2006, 2006-01-0263.

* cited by examiner

SYSTEMS AND METHODS FOR DETERMINING A PARTICULATE LOAD IN A PARTICULATE FILTER

TECHNICAL FIELD

The present teachings relate generally to systems and methods for determining a particulate load in a particulate filter, such as, for example, determining a soot load in a diesel particulate filter.

BACKGROUND

Environmental concerns have motivated the implementation of emission requirements for internal combustion engines and other combustion systems throughout much of the world. Catalytic converters have been used to eliminate many of the pollutants present in exhaust gas; however, a filter is often required to remove particulate matter, such as, for example, ash and soot. Wall-flow particulate filters, for example, are often used in engine after-treatment systems to remove particulates from the exhaust gas.

The ability to accurately measure or estimate the amount of particulate, such as, for example, soot, accumulated in a particulate filter is valuable as it helps to determine the regeneration schedule for the filter. The pressure drop behavior of a fluid (e.g., post-combustion gas) flowing through a particulate filter may be used, for example, to estimate the particulate load in the particulate filter. For example, as a particulate accumulates in the filter, the pressure drop across the filter (e.g., from an inlet end to an outlet end) increases due to the increased restriction of the fluid (e.g., gas) passing through the filter's permeable particulate (e.g., including soot particulate and ash particulate) and porous wall layers. The particulate load (e.g., soot load) in a particulate filter can be estimated, for example, assuming a simple relationship between this pressure drop, the flow rate of the fluid flowing through the particulate filter, and the soot load. Such pressure drop based systems and methods have been shown to accurately estimate soot load in a particulate filter even under very dynamic operating conditions. Under certain engine operating conditions, however, pressure drop based systems and methods can have some limitations, thereby providing somewhat less accurate soot load estimates. One period during which pressure drop based systems and methods may provide less accurate estimates includes during significant variation in the ratio of engine nitrogen oxide (NOx) emissions (e.g., engine-out NOx) to engine particulate matter (PM) emissions (e.g., engine-out PM).

Extremely high ratios of engine-out NOx to engine-out PM (NOx/PM) may be encountered, for example, when an engine is running in a mode that reduces soot mass in the filter through passive regeneration. Conversely, extremely low engine-out NOx/PM conditions may be encountered when an engine is experiencing exhaust gas recirculation (EGR) problems, causing increased soot emissions. Such changes may affect the relationship between pressure drop and soot load, resulting in less accurate soot load estimates, which generally assume a constant soot layer state with minimal passive regeneration of the filter (i.e., that the soot layer forming in each channel of the particulate filter remains consistent).

It may be desirable, therefore, to provide a pressure drop based approach for estimating particulate load that provides relatively high levels of estimation accuracy during all periods of engine operation, including, for example, during variable NOx/PM engine-out conditions. It also may be desirable to provide a pressure drop based approach for estimating particulate load that is relatively simple to implement, using the instrumentation and sensors already available as part of an engine's after-treatment system.

SUMMARY

The present teachings may solve one or more of the above-mentioned problems and/or may demonstrate one or more of the above-mentioned desirable features. Other features and/or advantages may become apparent from the description that follows.

In accordance with various exemplary embodiments of the present teachings, a method for regenerating a particulate filter may comprise calculating a soot layer state correction factor based on a rate of regeneration and a rate of particulate loading in the particulate filter; and calculating an estimated soot load in the particulate filter based on a pressure drop of an exhaust gas flowing through the particulate filter and the calculated soot layer state correction factor. The method for regenerating the particulate filter may further comprise causing regeneration of the particulate filter when the estimated soot load is greater than or equal to a threshold value.

In accordance with various additional exemplary embodiments of the present teachings, a method for regenerating a particulate filter may comprise determining an engine NOx emission, an engine particulate matter emission and a temperature, a flow rate, and a pressure drop of an exhaust gas flowing through the particulate filter; and determining a soot layer state parameter based on at least the engine NOx emission and the engine particulate matter emission. The method for regenerating a particulate filter may further comprise calculating a soot load estimate based on the pressure drop and the soot layer state parameter; and causing regeneration of the particulate filter when the soot load estimate is greater than or equal to a threshold value.

In accordance with various additional exemplary embodiments of the present teachings, a system for estimating soot load in a particulate filter may comprise a temperature sensor, a pressure drop sensor, and at least one engine sensor; and at least one controller configured to receive signals from the temperature sensor, the pressure drop sensor, and the at least one engine sensor, and dynamically estimate a soot layer state correction factor and a pressure drop based soot load based on the signals. The system for estimating soot load in a particulate filter may further comprise at least one controller, wherein the controller is configured to estimate the soot layer state correction factor based on a rate of regeneration and a rate of particulate loading in the particulate filter and control regeneration of the particulate filter based on the pressure drop based soot load.

Additional objects and advantages will be set forth in part in the description which follows, and in part will be obvious from the description, or may be learned by practice of the present teachings. The objects and advantages may be realized and attained by means of the elements and combinations particularly pointed out in the appended claims and their equivalents.

It is to be understood that both the foregoing general description and the following detailed description are exemplary and explanatory only and are not restrictive of the claims.

BRIEF DESCRIPTION OF THE DRAWINGS

The present teachings can be understood from the following detailed description either alone or together with the accompanying drawings. The drawings are included to provide a further understanding of the present teachings, and are incorporated in and constitute a part of this specification. The drawings illustrate one or more embodiments of the present teachings and together with the description serve to explain the principles and operation.

DESCRIPTION OF EXEMPLARY EMBODIMENTS

Although pressure drop based approaches can provide relatively accurate particulate load estimates throughout much of an engine's operation, during certain periods, that accuracy may still be somewhat limited. Notably, the confidence level in pressure drop based particulate load estimates may drop, for example, during extreme engine-out conditions (e.g., extremely high and low NOx/PM conditions), which can significantly alter the soot layer state in a particulate filter. That is, variability in the ratio of engine NOx emissions to engine PM emissions (e.g., engine-out NOx/PM) can, for example, impact a particulate filter's rate of regeneration and rate of soot loading, thus, significantly changing the soot layer state (e.g., soot layer permeability, packing density, and distribution) in the particulate filter.

In order to accurately estimate the soot load in a particulate filter over the entire range of engine operation (including under extreme engine conditions) exemplary embodiments of the present teachings consider a pressure drop based estimation approach that accounts for soot layer state changes induced by variable engine operating conditions. Accordingly, to increase overall estimation accuracy, a pressure drop based estimation approach, including, for example, conventional approaches based on a slope of dP/Q (i.e., the ratio of pressure drop to flow rate) and approaches based on a total pressure drop model, as disclosed, for example, in U.S. application Ser. No. 12/324,001, entitled "Systems and Methods for Estimating Particulate Load in a Particulate Filter," filed Nov. 26, 2008, the entire contents of which are incorporated by reference herein, can apply a soot layer state correction factor to account for soot layer state changes in soot load estimates.

Various exemplary embodiments mentioned above and described herein, therefore, include pressure drop based systems and methods that consider the rate of regeneration (passive and/or active regeneration) and the rate of particulate loading in the particulate filter, to accurately estimate the soot load in the filter at any given time during an engine's operation, thereby permitting timely regeneration of the filter when the estimated soot load is greater than or equal to a threshold value. In accordance with various exemplary embodiments, to account for a soot layer state change in the estimated soot load, a soot layer state correction factor may be calculated based on a ratio of the rate of regeneration to the rate of particulate loading in the particulate filter, which may, for example, be applied when calculating the estimated soot load based on a pressure drop of an exhaust gas flowing through the filter.

As used herein, the term "particulate filter" or "filter" refers to a structure which is capable of removing particulate matter, such as, for example, soot and ash, from a fluid stream, such as, for example, an exhaust gas stream, passing through the structure. The present teachings may apply to the removal of soot and ash and/or other particulate matter from any exhaust gas stream, such as, for example, exhaust gases produced by internal combustion engines, such as gasoline and diesel engines, and coal combustion flue gases produced in coal gasification processes. As used herein, the term "soot" refers to impure carbon particles that result from the incomplete combustion of hydrocarbons, such as, for example, during the internal combustion process. The term "ash" refers to non-combustible metallic material that is found in almost all petroleum products. For diesel applications, "ash" is typically produced from crankcase oil and/or fuel borne catalysts.

As used herein, the term "total pressure drop" refers to the pressure drop resulting from a combination of inlet/outlet contraction losses, inlet/outlet channel losses and permeable layer losses, including particulate (e.g., soot and ash) and wall permeability losses, represented by the relation: $\Delta p = \Delta p_{in/out} + \Delta p_{inlet-channel} + \Delta p_{outlet-channel} + \Delta p_{soot} + \Delta p_{ash} + \Delta p_{wall}$, wherein $\Delta p$ is the total pressure drop, $\Delta p_{in/out}$ represents the inlet/outlet contraction losses, $\Delta p_{inlet-channel}$ represents the inlet channel losses, $\Delta p_{outlet-channel}$ represents the outlet channel losses, $\Delta p_{soot}$ represents the soot permeable layer losses, $\Delta p_{ash}$ represents the ash permeable layer losses and $\Delta p_{wall}$ represents the wall permeable layer losses.

As used herein, the term "causing regeneration" refers to the initiation of filter regeneration, regardless of the type of regeneration. By way of example only, the present teachings contemplate using any known suitable regeneration methods and/or techniques, including, but not limited to, active and passive regeneration, and on-road and stationary regeneration. Exemplary regeneration techniques include, for example, heating inlet exhaust gases to a temperature and/or changing engine-out conditions to a NOx/PM ratio at which it is favorable to burn soot off of a particulate filter. Those ordinarily skilled in the art are familiar with various regeneration techniques for particulate filters and the present teachings contemplate any such regeneration techniques.

The filters of the present teachings can have any shape or geometry suitable for a particular application, as well as a variety of configurations and designs, including, but not limited to, a flow-through structure, a wall-flow structure, or any combination thereof (e.g., a partial-flow structure). Exemplary flow-through structures include, for example, any structure comprising channels or porous networks or other passages that are open at both ends and permit the flow of exhaust gas through the passages from one end to an opposite end. Exemplary wall-flow structures include, for example, any structure comprising channels or porous networks or other passages with individual passages open and plugged at opposite ends of the structure, thereby enhancing gas flow through the channel walls as the exhaust gas flows from one end to the other. Exemplary partial-flow structures include, for example, any structure that is partially flow-through and partially wall-flow. In various exemplary embodiments, the filters, including those filter structures described above, may be monolithic structures. Various exemplary embodiments of the present teachings, contemplate utilizing the cellular geometry of a honeycomb configuration due to its high surface area per unit volume for deposition of soot and ash. Those having ordinary skill in the art will understand that the cross-section of the cells of a honeycomb structure may have virtually any shape and are not limited to hexagonal. Similarly, a honeycomb structure may be configured as either a flow-through structure, a wall-flow structure, or a partial-flow structure.

Figure 1:
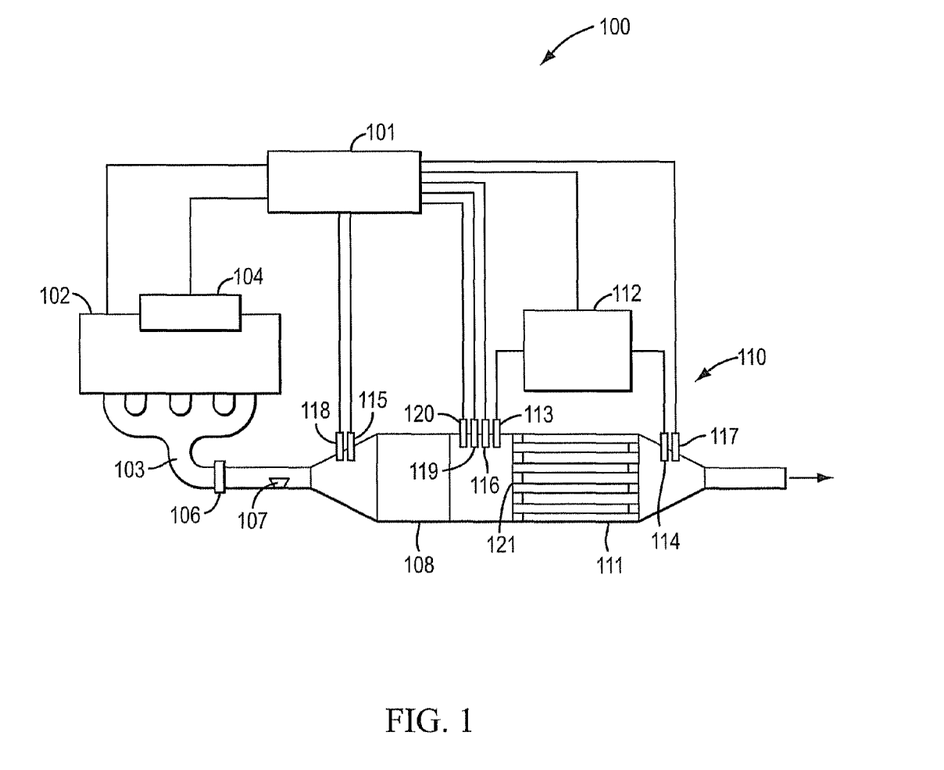
FIG. 1 is a schematic diagram of an exemplary embodiment of a system for estimating soot load in accordance with the present teachings.

FIG. 1 is a schematic, block diagram of one exemplary embodiment of a system for estimating soot load in accordance with the present teachings. A soot load estimation system 100 is shown in operational relationship with an internal combustion engine 102. The engine 102 can be any type of internal combustion engine, including, but not limited to, for example, an auto-cycle engine, a two-stroke engine or a diesel engine, used in any type of machine or vehicle, stationary or moving, including but not limited to a pump, generator, automobile, truck, boat, or train.

The engine 102 has an exhaust manifold 103 to direct exhaust gases from the engine 102 to an exhaust system 110. Exhaust system 110 is coupled to the exhaust manifold 103 via an exhaust flange 106 and may include a particulate filter 111, a pressure drop sensor 112, and temperature sensors 116 and 117. In an exemplary embodiment of a diesel engine, depicted for example, in FIG. 1, a doser 107 for hydrocarbon injection supplied by post- or in-cylinder injection, a temperature sensor 115 and a diesel oxidation catalyst (DOC) 108 may also be provided upstream of the particulate filter 111. Also in an exemplary embodiment, as depicted for example in FIG. 1, a flow rate sensor 118 may also be included. As would be understood by those ordinarily skilled in the art, however, flow rate may also be calculated rather than or in addition to being sensed.

In various additional exemplary embodiments, as also shown in FIG. 1, a nitrogen oxide (NOx) sensor 119 and/or a soot sensor 120 may also be provided upstream of the particulate filter 111. As would be understood by those of ordinary skill in the art, exhaust gas flowing between the engine 102 and the filter 111 may be treated by various components, such as, for example, the doser 107 and the DOC 108, prior to reaching the particulate filter 111. Accordingly, to obtain true engine-out NOx and/or engine-out soot levels at the filter 111 (i.e., readings that account for changes made to the exhaust between the engine 102 and the filter 111), as shown in FIG. 1, in various embodiments, the NOx sensor 119 and the soot sensor 120 may be positioned proximate to an inlet end 121 of the particulate filter 111.

As will be described in further detail below, however, engine-out NOx and/or engine-out soot may also be determined via model-based lookup tables (also referred to herein as virtual sensors) rather than or in addition to being physically sensed. As would be understood by those of ordinary skill in the art, various embodiments of the present teachings additionally consider sensing and/or determining various types of engine particulate emissions, including, for example, engine-out particulate matter and/or engine-out carbon depending on what type of sensors are available and what type of information is required for the system for which particulate matter estimation is desired.

Although the particulate filter 111 is depicted as a cylindrical wall-flow monolith, those ordinarily skilled in the art would understand that such shape and configuration is exemplary only and particulate filters in accordance with the present teachings may have any shape or geometry suitable for a particular application, as well as a variety of configurations and designs, including, but not limited to, a wall-flow structure, a flow-through structure, and a partial-flow structure, any of which also may be a monolithic structure.

Those having ordinary skill in the art will further understand that the number and positioning of sensors 112, 115, 116, 117, 118, 119 and 120, and the various post-combustion gas treatment components, such as for example the doser 107 and the DOC 108, depicted in FIG. 1, are schematic and exemplary only and that the exhaust system 110 may include a variety of sensor configurations and engine exhaust treatment components without departing from the scope of the present teachings.

Those having ordinary skill in the art would understand how to modify the sensors and/or components depicted in FIG. 1 based on desired treatment and control mechanisms without departing from the scope of the present teachings. Various exemplary embodiments of the present teachings, for example, contemplate the pressure drop sensor 112 as a set of sensors 113 and 114 positioned upstream and downstream of the particulate filter 111, respectively. Various additional exemplary embodiments of the present teachings consider a single pressure drop sensor 112 configured to measure the differential pressure across the particulate filter 111. Various exemplary embodiments of the present teachings further contemplate, for example, a set of sensors 116 and 117 respectively positioned upstream and downstream of the particulate filter 111 to determine, for example, an average temperature of the exhaust gas flowing through the particulate filter 111. Various additional exemplary embodiments of the present teachings also contemplate a single temperature sensor 116 configured to measure the input temperature of the particulate filter 111, for example, when only one sensor is available, whereas various further exemplary embodiments of the present teachings contemplate a single temperature sensor 117 configured to measure the output temperature of the particulate filter 111, for example, during regeneration conditions. Furthermore, various exemplary embodiments of the present teachings additionally consider the temperature sensor 115 configured to measure the DOC out/particulate filter in exhaust gas temperature using an energy balance on the DOC 108.

Based on the present teachings, those having ordinary skill in the art would understand various other sensor types, positions, and configurations that may be used to implement the soot load estimation systems and methods in accordance with exemplary embodiments.

Various exemplary embodiments of the present teachings contemplate using existing sensors already available as part of the exhaust system 110. Various exemplary embodiments of the present teachings also contemplate systems which include additional sensors as needed to provide the signal inputs used in the systems and methods of the present teachings. Those skilled in the art would understand that the type, number and configuration of such sensors may be chosen as desired based on availability, expense, efficiency and other such factors.

Those skilled in the art also would understand that the exhaust system 110, as a whole, is exemplary only and not intended to be limiting of the present teachings and claims. For example, in FIG. 1, the DOC 108 may be positioned upstream of the particulate filter 111 to better facilitate heating of the exhaust gas through reactions with hydrocarbons (HC) provided, for example, by post or in-cylinder injection by doser 107. Depending upon the type of engine used and the particular application employed, the exhaust system 110 may include additional after-treatment components, such as, for example, additional catalysts, traps, mufflers, heaters, reductant injectors, and/or bypass valves in combination with the particulate filter 111. One or more such after-treatment components may be positioned in the flow path of the exhaust downstream of the engine 102 and upstream of the particulate filter 111.

A controller 101 may be configured to receive signals from temperature sensors 115, 116, and 117, the flow rate sensor 118, the NOx sensor 119 and the soot sensor 120. The controller 101 is configured to dynamically estimate a soot layer state correction factor, such as, for example, $K_{c,t}$ or $M_{c,t}$, for the particulate filter 111 based on the signals received from one or more of the sensors 115, 116, 117, 118, 119 and 120 as set forth in the following exemplary embodiments and as would be understood by those having ordinary skill in the art depending on which sensors are available in a system for which particulate matter estimation is desired. The controller 101 may include an existing controller such as an engine control unit (ECU), a dedicated controller, or control may be distributed among more than one controller, as would be understood by one having ordinary skill in the art.

In various exemplary embodiments of the present teachings, the engine 102 can include additional sensors and/or instrumentation, indicated generally at 104, which provide information about engine performance (e.g., amount of oil consumed, mass airflow etc.) and engine running conditions (e.g., load, rotation speed etc.) to the controller 101. The additional sensors and/or instrumentation, indicated generally at 104, can also provide information regarding engine soot generation, and soot burned through active and/or passive regeneration (e.g., engine map, engine backpressure, transient factor, mass flow rate (Mexh), exhaust pressure, bed temperature, $O_2$ concentration, NO concentration, and $NO_2$ concentration). In various exemplary embodiments of the present teachings, the controller 101 can be configured to dynamically estimate the soot layer state correction factor based on the signals received from one or more of the sensors 104 and/or one or more of the temperature sensors 115, 116 and 117, the flow rate sensor 118, the NOx sensor 119 and the soot sensor 120, as set forth in the following exemplary embodiments and as would be understood by those having ordinary skill in the art depending on which sensors are available in a system for which particulate matter estimation is desired. Those having ordinary skill in the art would understand, for example, that in various exemplary embodiments of the present teachings, engine-out NOx and engine-out soot may also be determined via model-based lookup tables (e.g., virtual sensors) based on the engine 102 operating conditions (e.g., combustion and temperature), either in lieu of or in addition to being sensed.

In various exemplary embodiments of the present teachings, the controller 101 can be configured to dynamically estimate a pressure drop based soot load ($SL_{PD}$) in the particulate filter 111 based on the signals received from one or more of the sensors 112, 115, 116, 117 and 118 as set forth in the following exemplary embodiments and as would be understood by those having ordinary skill in the art depending on which sensors are available in a system for which particulate matter estimation is desired.

In accordance with various exemplary embodiments of the present teachings, the controller 101 can be configured to apply the soot layer state correction factor, such as, for example, $K_{c,t}$ or $M_{c,t}$, to the pressure drop based soot load ($SL_{DP}$) to account for soot layer state changes (e.g., soot layer permeability changes and soot layer packing density changes) in the soot load estimates (i.e., to "correct" the soot load estimates of the existing estimation scheme).

As would be understood by those of ordinarily skill in the art, each pressure drop based approach to soot load estimation has a parameter, such as, for example, a soot layer state parameter, $K_t$ or $M_t$, that can be directly correlated to the soot layer state in the particulate filter 111. Conventional pressure drop based approaches to soot load estimation assume, for example, that this parameter has a constant value that is equal to a reference soot layer state value, such as, for example, $K_0$ or $M_0$, for a predefined engine-out condition (e.g., that $K_t = K_0$ or $M_t = M_0$). As would be further understood by those of ordinarily skill in the art, for a given pressure drop and flow rate, assuming minimal passive regeneration of the filter, the reference soot layer state value is a function of soot permeability and density. Thus, for a given particulate filter (e.g., for a given filter geometry), the reference soot layer state value (e.g., $K_0$ or $M_0$) can be determined experimentally or via filter modeling based on the slope of pressure drop to soot load.

Various pressure drop based approaches to soot load estimation may further consider this parameter to be a function of the engine-out conditions at the engine 102, such as the ratio of engine-out NOx to engine-out soot (NOx/soot) at the engine 102. As would be understood by those of ordinary skill in the art, however, exhaust exiting the engine 102 may flow through various after-treatment components prior to entering the particulate filter 111, thus the NOx/soot ratio (and the $NO_2$/NOx ratio) of the gas may be significantly altered between the engine 102 and the particulate filter 111, thereby causing $K_t$ or $M_t$ to deviate substantially from unity.

To account for soot layer state changes in the soot load estimates ($SL_{DP}$) the present teachings consider the soot layer state parameter (e.g., $K_t$ or $M_t$) to be dynamic and a function of regeneration and particulate loading in the particulate filter 111. Various exemplary embodiments of the present teachings thus consider a pressure drop based approach for estimating particulate load that captures soot layer state changes by constantly monitoring engine-out (e.g., exhaust gas) conditions (i.e., physical parameters) at the particulate filter 111, determining a soot layer state parameter (e.g., $K_t$ or $M_t$) that accounts for alternations in the gas between the engine 102 and the filter 111. Various exemplary embodiments of the present teachings thus determine a soot layer state correction factor (e.g., $K_{c,t}$ or $M_{c,t}$) to correct the reference soot layer state value (e.g., $K_0$ or $M_0$), thereby dynamically updating the soot layer state parameter used in pressure drop based approaches to soot load estimation.

Although it is envisioned that a soot layer state correction factor may be implemented in a variety of pressure drop based approaches to soot load estimation known to those ordinarily skilled in the art, one exemplary embodiment in accordance with the present teachings may utilize a basic slope based estimation approach, which considers the slope of the ratio of pressure drop to flow rate (i.e., the slope of dP/Q) to estimate the soot load ($SL_{DP}$) in the particulate filter 111. A summary of how a soot layer state correction factor ($K_{c,t}$) may be estimated and applied to this pressure drop based estimation technique is provided below.

Slope based estimation methods generally assume (1) negligible second order effects on flow rate and (2) that temperature effects on fine soot layer pore permeability are canceled by temperature effects on gas viscosity. This leads to a relatively simple relationship between the pressure drop, the flow rate, and the soot load. A soot layer state parameter at any given time t ($K_t$) may therefore be defined as the slope between dP/Q and soot load:

$$K_t = \left[\left(\frac{dP}{Q}\right)_t - \left(\frac{dP}{Q}\right)_0\right] \Big/ SL_{DP} \quad [1]$$

wherein $(dP/Q)_t$ is the ratio of pressure drop to flow rate at time t, $(dP/Q)_0$ is the ratio of pressure drop to flow rate at zero soot load (i.e., the reference value for a clean filter), and $SL_{DP}$ is the filter soot load. Thus, when $K_t$ is held constant, for example, when assuming limited passive regeneration and therefore a low NOx/PM ratio (i.e., when assuming $K_t=K_0$), $SL_{DP}$ is assumed to be substantially equal to $[(dP/Q)_t - (dP/Q)_0]$. As above, however, to account for variable engine-out conditions, the present teachings consider that the soot layer state parameter ($K_t$) is dynamic and a function of regeneration rate (R in g/s) and particulate loading (L in g/s) in the particulate filter 111, and thereby impacted by engine-out NOx/soot, temperature, flow rate, and soot load in the filter 111. In other words, in accordance with various exemplary embodiments, a dynamic soot layer state parameter ($K_t$) can be derived as a function of a weighted ratio of R/L.

In accordance with one exemplary embodiment of the present teachings, a weighted ratio of R/L at time t ($r_t$), updated at every time interval $\Delta t$, may be calculated as:

$$r = r_{t-\Delta t}(1-\alpha \Delta t) + R_{\Delta t}\alpha \Delta t \quad [2]$$

wherein $R_{\Delta t}$ is the instantaneous R/L ratio during the interval $\Delta t$ and $\alpha$ is 1 hr$^{-1}$. An instantaneous regeneration rate (R) and loading rate (L) can be estimated, for example, from filter weight and engine emissions (e.g., NOx and soot) using a conventional mass balance approach. The present teachings contemplate, for example, using any known suitable mass balance methods and/or techniques as would be understood by those skilled in the art. By way of example only, the present teachings contemplate using any known suitable mass balance based soot estimation methods and/or techniques, including, but not limited to, estimating an amount of soot mass change in the particulate filter 111 by determining the soot influx into the filter and subtracting the soot burnout by filter regeneration.

As would be understood by those of ordinary skill in the art, the above expression is exemplary only and may take various forms depending on which sensors and/or information are available in the system for which particulate matter estimation is desired. In various additional embodiments, for example, a dynamic soot layer state parameter ($K_t$) can be calculated as a function of a weighted ratio of engine-out NOx to engine-out particulate matter (i.e., NOx/PM), including, for example, a weighted ratio of engine-out NOx/engine-out soot (i.e., NOx/soot) and/or a weighted ratio of engine-out NOx to engine-out carbon (i.e., engine-out NOx/carbon), at the particulate filter 111.

In accordance with another embodiment of the present teachings, for example, a weighted ratio of NOx/Soot at time t ($r_t$) updated at every time interval $\Delta t$, may be determined as:

$$r = r_{t-\Delta t}\{1-[\exp(1/R_{\Delta t}^b)-1]\alpha \Delta t\} + R_{\Delta t}[\exp(1/T_i^b)-1]\alpha \Delta t \quad [3]$$

wherein for a $\Delta t$ of 0.5 hours, $R_{\Delta t}$ is the instantaneous NOx/soot ratio during the interval $\Delta t$ (e.g., from sensors 119 and 120 and/or from virtual sensors in the controller 101), a is a time constant equal to 1/e−1, and b is a constant equal to 0.5. As would be understood by those of ordinary skill in the art, for methods based on a weighted ratio of NOx/Soot, temperature may generally be an additional input.

In various additional exemplary embodiments, engine load (e.g., the average of the ratio between real torque and max torque at the same engine speed) can be used as an input variable impacting the time constant. In still further exemplary embodiments, signal processing techniques, such as, for example, gating and filtering may also be combined to generate the expression.

As above, a dynamic soot layer state parameter at time t ($K_t$) can be determined as a function of the weighted ratio of R/L at time t ($r_t$) as expressed below:

$$K_t = f(r_t) \quad [4]$$

As would be understood by those of ordinary skill in the art, for a given application, a fitted form of this function may be derived by plotting $K_t$ vs. $r_t$, wherein $K_t$ data points are determined, for example, by plugging experimentally measured pressure drops, flow rates and soot loads into equation [1], and $r_t$ data points are determined, for example, as explained above using equation [2]. The fitted relation for $K_t$ may then be used in conjunction with derived $r_t$ values to calculate a soot layer state parameter at any given time t ($K_t$) as will be shown and described in more detail below with reference to experimental data.

In accordance with various exemplary embodiments of the present teachings, the dynamic soot layer state parameter at time t ($K_t$) can be supplied directly to the controller 101 to estimate $SL_{DP}$ at time t based on dP/Q. Or, in accordance with various additional embodiments, a soot layer state correction factor at time t ($K_{c,t}$) can be estimated and applied to $SL_{DP}$ (i.e., from an existing estimation scheme) to correct the estimate based on the following relations:

$$SL_{DP} = \left[\left(\frac{dP}{Q}\right)_t - \left(\frac{dP}{Q}\right)_0\right] \Big/ K_t \quad [5]$$

$$K_{c,t} = K_t / K_0 \quad [6]$$

$$SL_{DP} = \left[\left(\frac{dP}{Q}\right)_t - \left(\frac{dP}{Q}\right)_0\right] \Big/ [K_0(K_{c,t})] \quad [7]$$

wherein, as above, $K_t$ is the actual soot layer state parameter at time t and $K_0$ is the reference value at a predefined engine-out condition. In other words, $K_0$ may be the soot layer state parameter being used in the existing calibration based on assumptions made by the pressure drop based estimation approach.

The exemplary method described above relates to the implementation of a soot layer state correction factor into a pressure drop based estimation approach to account for soot layer state changes. A second exemplary embodiment in accordance with the present teachings may utilize a total pressure drop based estimation approach, which considers the total pressure drop across a filter to be a combination of inlet/outlet contraction losses, inlet/outlet channel losses and permeable layer losses, including particulate layer losses (e.g., soot layer ($\Delta p_{sl}$) and ash layer ($\Delta p_{al}$)) and wall permeability losses.

As above, the total pressure drop based estimation approach has a soot layer state parameter ($M_t$) that can be directly correlated to the soot layer state in a particulate filter.

Pressure loss through the soot layer ($\Delta p_{sl}$) can be determined, for example, as:

$$\Delta p_{sl} = \frac{u\mu\delta_{sl}}{k_{sl}SCF_{sl}} \quad [8]$$

$$= \frac{u\mu}{k_{sl}SCF_{sl}} \frac{SL}{\rho_{sl}A_{sl}}$$

$$= \left(\frac{1}{\rho_{sl}k_{sl}}\right)\left(\frac{\mu}{SCF_{sl}}\right)\left(\frac{uSL}{A_{sl}}\right)$$

wherein u is the surface velocity across the soot layer, $\mu$ is gas viscosity, $\delta_{sl}$ is the soot layer's thickness, $k_{sl}$ is the soot layer's permeability, $SCF_{al}$ is the Stokes-Cunningham factor accounting for non-continuum gas effects, $p_{sl}$ is the soot layer's density, and $A_{sl}$ is the total filtration area of the filter. A soot layer state parameter at any given time t ($M_t$) may therefore be defined as:

$$M_t = \frac{1}{\rho_{sl}k_{sl}} \quad [9]$$

and a soot layer state correction factor at time t ($M_{c,t}$) can be estimated and applied to $\Delta p_{sl}$ to correct the estimate based on the following relations:

$$\Delta p_{sl} = M_t\left(\frac{\mu}{SCF_{sl}}\right)\left(\frac{uSL}{A_{sl}}\right) \quad [10]$$

$$M_{c,t} = M_t/M_0 \quad [11]$$

$$\Delta p_{sl} = M_{c,t}(M_0)\left(\frac{\mu}{SCF_{sl}}\right)\left(\frac{uSL}{A_{sl}}\right) \quad [12]$$

wherein, as above, $M_t$ is the actual soot layer state parameter at time t, and $M_0$ is the reference value at a predefined engine-out condition. In other words, $M_0$ may be the soot layer state parameter being used in the existing calibration based on assumptions made by the pressure drop based estimation approach.

Figure 2:
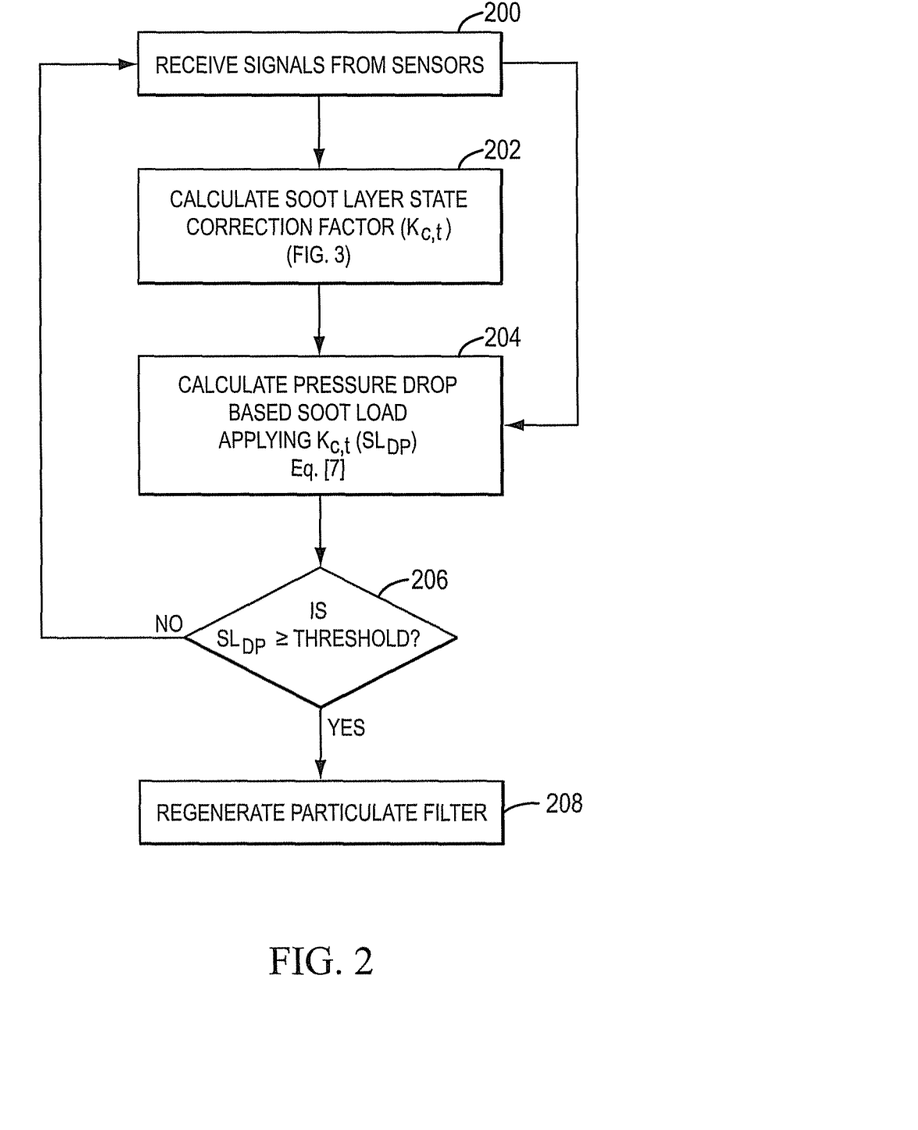
FIG. 2 is a flow diagram depicting an exemplary embodiment of a method for causing regeneration of a particulate filter in accordance with the present teachings.

FIG. 2 shows a logic flow diagram depicting an exemplary embodiment for causing regeneration of a particulate filter in accordance with the present teachings. At step 200 of FIG. 2, input signals are received from one or more sensors. The sensors may be selected from a variety of sensors such as those described above with reference to the exemplary embodiment of FIG. 1. The signals can correspond to the temperature, flow rate, and pressure drop of an exhaust gas flowing through the particulate filter, information about engine emissions (e.g., engine-out NOx and engine-out soot), information about the configuration of the particulate filter (e.g., geometry and microstructure), as well as one or more engine operating conditions, such as, for example, the amount of oil consumed and/or engine run time, and one or more engine running conditions, such as, for example, load and/or rotation speed.

Various exemplary embodiments of the present teachings additionally consider directly estimating the flow rate of the exhaust from other measurements, such as, for example, engine speed and load or fuel flow and air flow. The exhaust flow rate can be estimated, for example, by adding the flow rate of the air admitted into the engine and the total quantity of fuel injected into the engine. Various additional embodiments further consider directly estimating engine emissions (e.g., engine-out conditions) through model-based lookup tables based on other measured values, such as for example, engine combustion and temperature. Various embodiments of the present teachings additionally consider sensing and/or estimating various types of engine particulate emissions, including, for example, engine-out particulate matter (PM), engine-out soot and/or engine-out carbon depending on what sensors are available and what information is required for the method for which particulate matter estimation is desired. As would be understood by those of ordinary skill in the art, for example, NOx/soot can be converted to NOx/PM using an elementary carbon ratio.

As shown at step 202 of FIG. 2, a soot layer state correction factor ($K_{c,t}$) is continuously calculated from the measured or estimated data (e.g., engine-out NOx, engine-out soot, temperature, flow rate and/or engine load) as described above and shown and described in more detail below with reference to FIG. 3.

As shown at step 204 of FIG. 2, a pressure drop based soot load estimate ($SL_{DP}$) in the particulate filter is continuously calculated from the measured or estimated data (e.g., temperature, flow rate, pressure drop, filter parameters, bed temperature, $O_2$ concentration, NO concentration, $NO_2$ concentration, etc.), while applying the soot layer state correction factor ($K_{c,t}$) to account for soot layer state changes in the soot load estimate. The present teachings contemplate applying a soot layer state correction factor to any known pressure drop based estimation methods and/or techniques as would be understood by those skilled in the art, including, for example, the dP/Q slope based method utilizing, for example, equation [6] or a total pressure drop based method utilizing, for example, equation [11].

As above, various exemplary embodiments of the present teachings, may also directly use a dynamic soot layer state parameter ($K_t$) to estimate soot load ($SL_{DP}$) such as, for example, whenever an estimation approach is not already calibrated to use a constant soot layer state value (i.e., not already calibrated to use the reference value $K_0$).

At step 206 of FIG. 2, the estimated soot load ($SL_{DP}$) can then be compared to a threshold soot load to determine whether or not the soot load level in the particulate filter is sufficient to warrant regeneration of the filter. If the estimated soot load is greater than or equal to the threshold value, the system causes regeneration of the filter, as indicated by the last step, 208, shown in the flow diagram of FIG. 2. The present teachings contemplate, for example, using any known suitable regeneration methods and/or techniques as would be understood by those skilled in the art. By way of example only, the present teachings contemplate using any known suitable regeneration methods and/or techniques, including, but not limited to, active and passive regeneration, and on-road and/or stationary regeneration. Exemplary regeneration techniques can include, for example, heating inlet exhaust gases to a temperature and/or changing engine-out conditions to a NOx/PM ratio at which it is favorable to burn soot off of a particulate filter.

Figure 3:
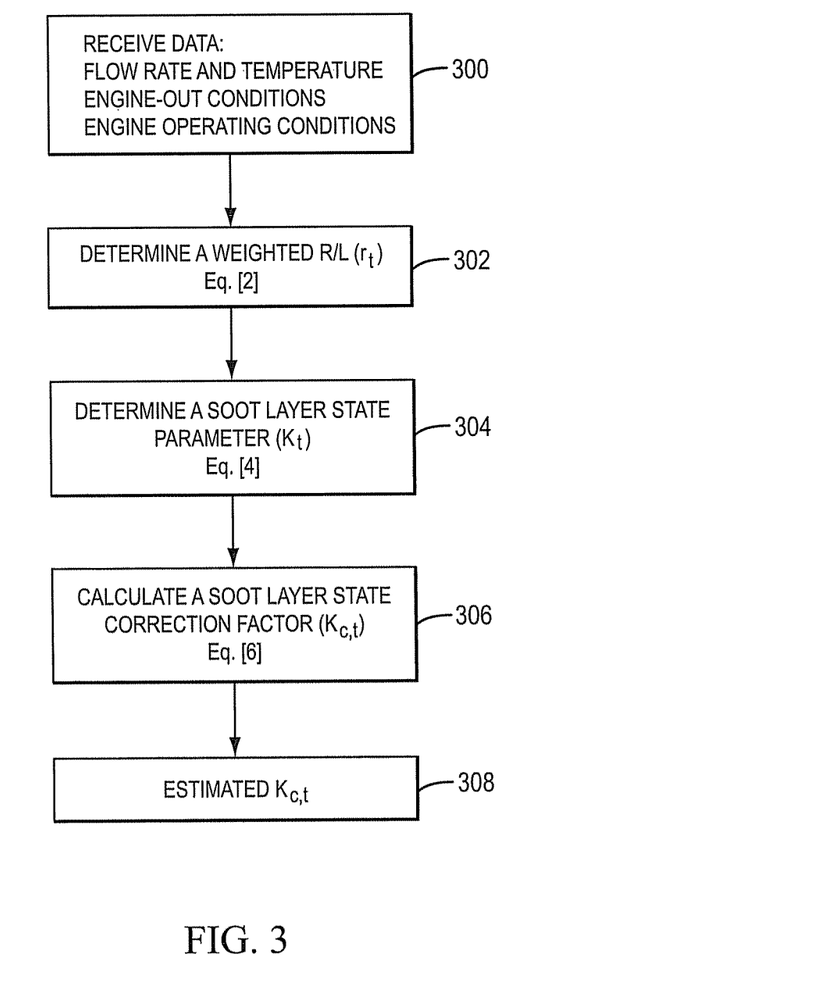
FIG. 3 is a flow diagram depicting an exemplary embodiment of a method for calculating a soot layer state correction factor in accordance with the present teachings.

Referring now to FIG. 3, a flow diagram depicting one exemplary embodiment for calculating a soot layer state correction factor ($K_{c,t}$) in accordance with the present teachings is depicted. As shown at step 300 of FIG. 3, data is received corresponding to the flow rate and temperature of an exhaust gas flowing through the particulate filter, information about engine emissions (e.g., engine-out NOx and engine-out soot), as well as one or more engine operating conditions, such as, for example, the amount of oil consumed and/or engine run time, and one or more engine running conditions, such as, for example, load and/or rotation.

As explained above, at step 302 of FIG. 3, a weighted ratio of the rate of regeneration to the rate of soot loading (i.e., R/L) in the particulate filter at time t ($r_t$) is determined, for example, utilizing equation [2]. Those of ordinary skill in the art would understand, however, that the weighted ratio $r_t$ may take various forms depending on which sensors and/or information are available in the system for which particulate matter estimation is desired. Various additional embodiments of the present teachings consider, for example, determining a weighted ratio of engine-out NOx to engine-out particulate matter (e.g., NOx/soot) to determine the weighted ratio $r_t$.

At step 304 of FIG. 3, a current soot layer state parameter ($K_t$) is determined by utilizing, for example, a fitted form of equation [4] expressing $K_t$ as a function of $r_t$. At step 306 of FIG. 3, a soot layer state correction factor ($K_{c,t}$) is then calculated based on the soot layer state parameter ($K_t$) and a reference soot layer state value ($K_0$) (i.e., the soot layer state value currently used in the existing estimation scheme) utilizing, for example, equation [6]. The $K_{c,t}$ calculation is then used at step 202 of FIG. 2 at step 308.

The scheme depicted in the flow diagram of FIG. 3 may be run every time step that it is called, for example, by step 202 in FIG. 2. Those skilled in the art would understand that the frequency with which the scheme is called depends upon the application applied.

To validate and confirm the accuracy of the above systems and methods, experimental tests were run to demonstrate dP/Q based soot load estimates generated both with and without a soot layer state correction factor, as shown and described below with reference to FIGS. 4-7 and Table 1.

Figure 4A:
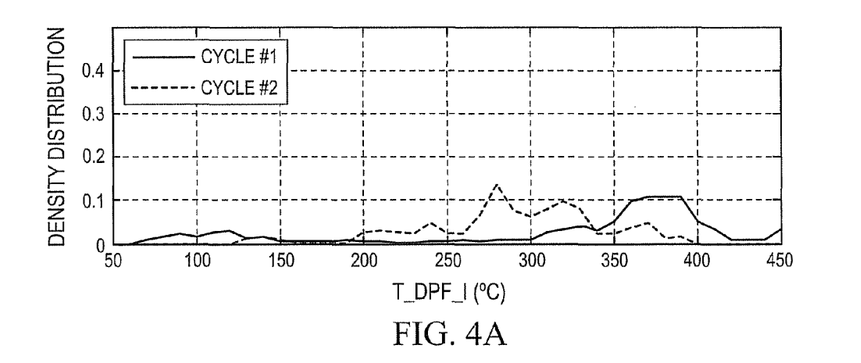
FIGS. 4A and 4B show temperature profiles for various emission test cycles.
Figure 4B:
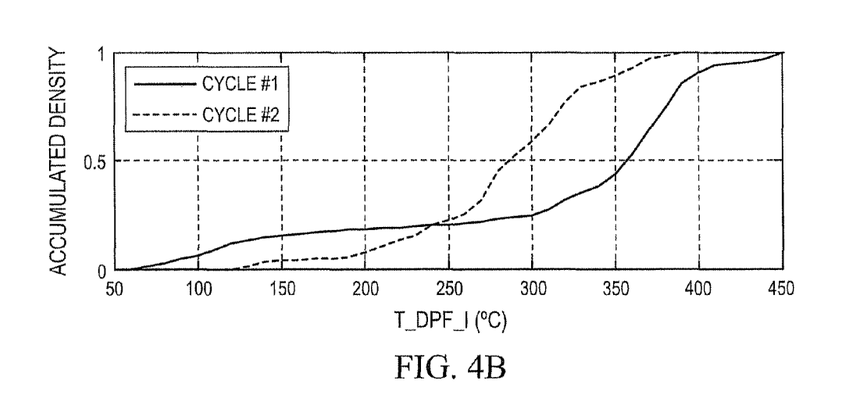

As illustrated in FIGS. 4A and 4B, the experiments used two types of test cycles, Cycle #1 and Cycle #2. With a given cycle, engine exhaust gas recirculation (EGR) flow could be tuned to achieve various engine-out conditions (e.g., various NOx/soot ratios). FIGS. 4A and 4B illustrate, for example, the temperature profiles exhibited by each of Cycle #1 and Cycle #2, demonstrating exhaust temperature (° C.) at a filter inlet (T_DPF_I).

Figure 5A:
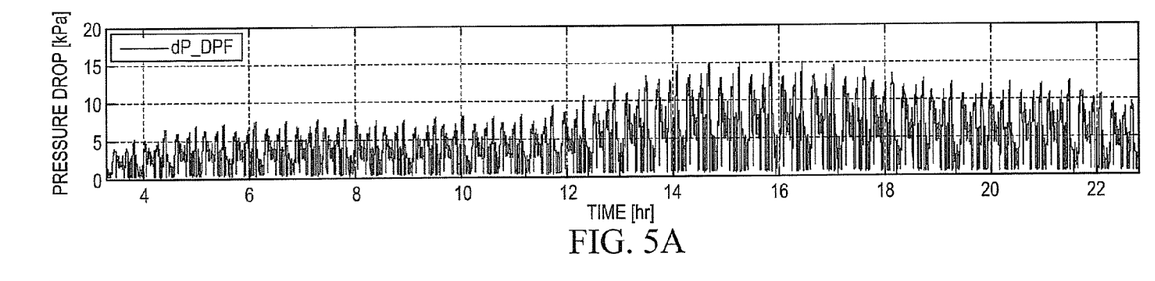
FIGS. 5A, 5B and 5C show various engine parameters versus time for an exemplary experimental test cycle.
Figure 5B:
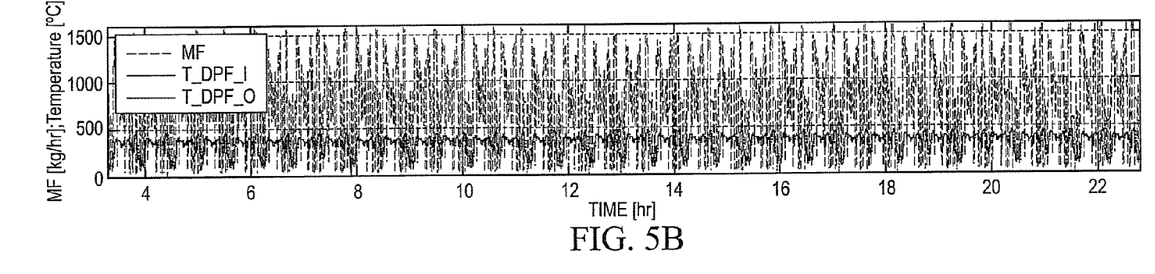
Figure 5C:
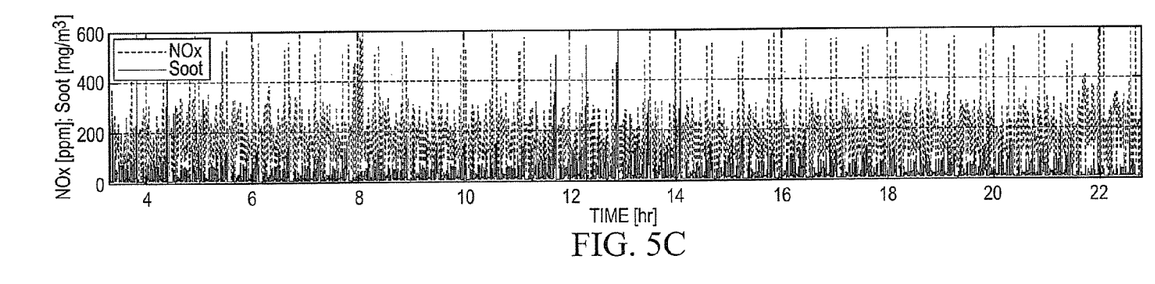
Figure 6:
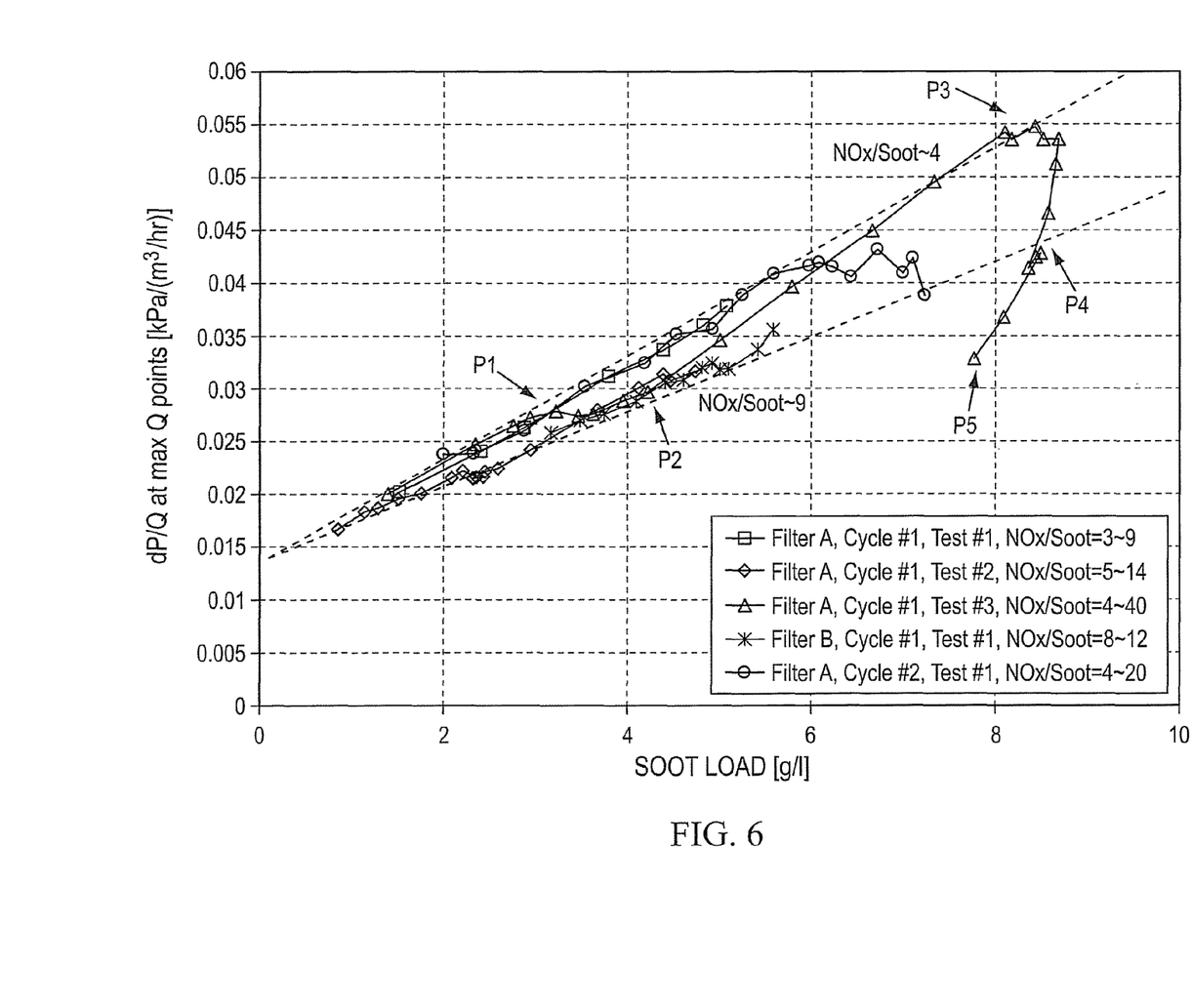
FIG. 6 shows results obtained from experimental tests of dP/Q as a function of soot load corresponding to various test cycles.
Figure 7:
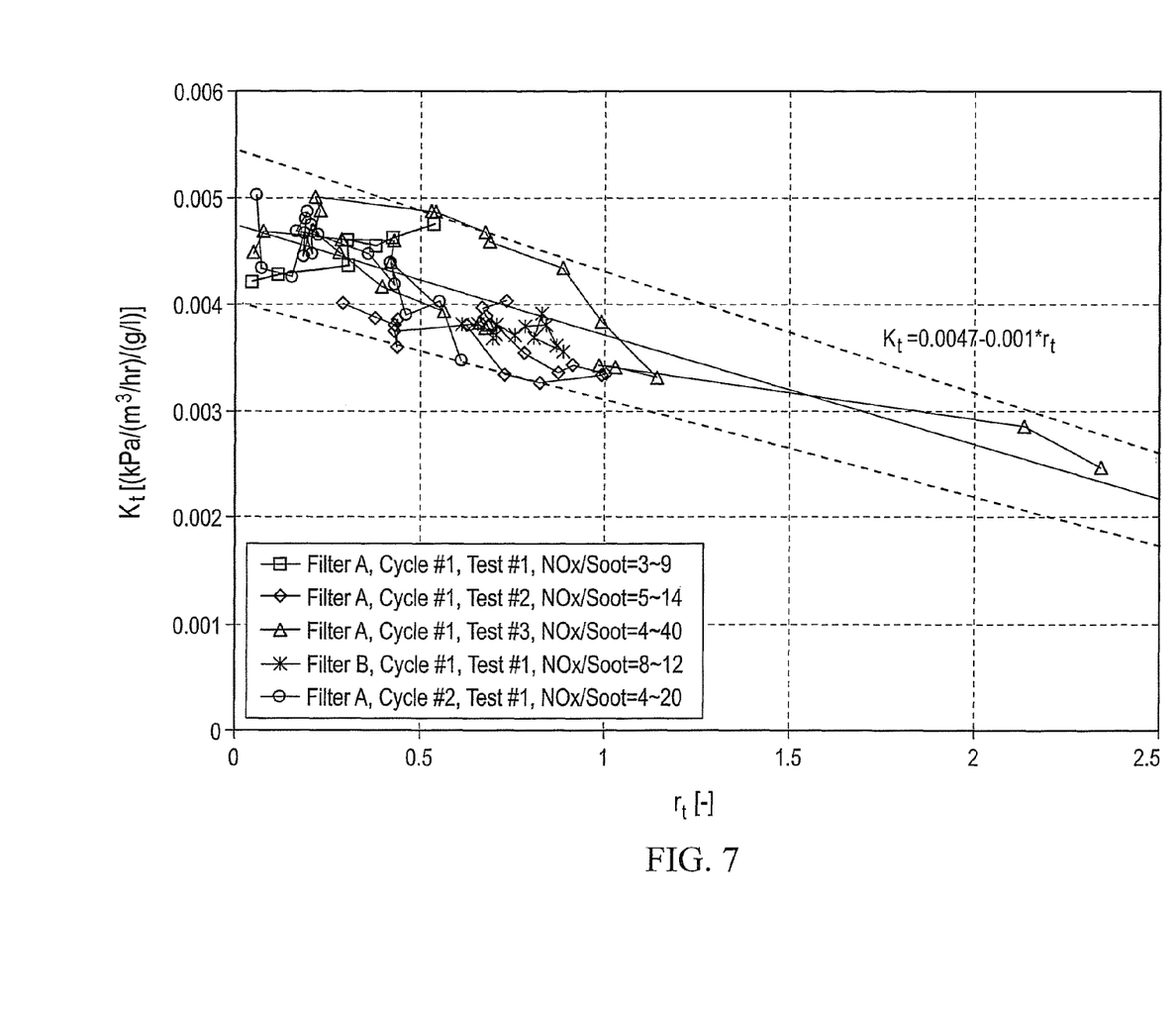
FIG. 7 shows results obtained from experimental tests of soot layer state parameter, $K_t$, as a function of a weighted regeneration/loading rate, $r_t$, for the various test cycles of FIG. 6.

To demonstrate soot load estimation during all periods of engine operation and for various applications, various filter/cycle combinations were tested using different NOx/soot ratios as shown in FIGS. 6 and 7. Two filters were used, Filter A and Filter B, each having similar geometric, microstructure and coating properties. To mitigate deep bed impacts, for each test, a diesel particulate filter (DPF) (i.e., Filter A or Filter B) was initially conditioned for approximately 3 hours under a high engine-out NOx/soot ratio, thereby allowing approximately 0.5 g/l of soot to accumulate within each filter. A 30-minute transient test cycle (i.e., Cycle #1 or Cycle #2) was then run continuously for approximately 22 hours, while engine-out conditions were actively tuned through EGR increase/decrease and soot entering the DPF was measured via a soot sensor. For demonstration purposes, FIGS. 5A-5C illustrate the engine operating conditions (i.e., pressure drop across the filter (dP_DPF), mass flow (MF), temperature at the inlet (T_DPF_I) and outlet (T_DPF_O) of the filter, NOx and soot) for one exemplary experimental test cycle (Filter A, Cycle #1, Test #3) with an EGR increase/decrease of approximately 3% used to control NOx/soot in a range of about 4 to about 40.

The dP/Q at the max flow (O) point in each cycle, which was found at the end of each cycle, was used to study the pressure drop response during each test. FIG. 6 shows the dP/Q at max Q points as a function of soot load for the various test cycles. As illustrated in FIG. 6, using Cycle #1, Test #1 was performed on Filter A with a relatively low NOx/soot ratio of approximately 4 (indicated by the top dotted line) with an EGR increase/decrease of approximately 3% used to control NOx/soot in a range of about 3 to about 9. Test #1 was performed on Filter B and Test #2 was performed on Filter A with a relatively median NOx/soot ratio of approximately 9 (indicated by the bottom dotted line) with an EGR increase/decrease of approximately 3% used to control NOx/soot in a range of about 5 to about 14 and about 8 to about 12, respectively. And Test #3 was performed on Filter A with a variable NOx/soot ratio set at multiple NOx/soot points of approximately 4, 9 and 30 with an EGR increase/decrease of approximately 3% used to control NOx/soot in a range of about 4 to about 40. Similarly, using Cycle #2, Test #1 was performed on Filter A with an EGR increase/decrease of approximately 3% used to control NOx/soot in a range of about 4 to about 20.

As demonstrated in FIG. 6 for the Filter A, Cycle #1, Test #3 test cycle, points marked as P1 to P5 represent filter conditions right before a switch between NOx/soot points. As shown at each point, the slope of dP/Q vs. soot load changed as the NOx/soot ratio changed, giving a high slope with low NOx/soot and a low slope with high NOx/soot, thus demonstrating the substantial effect that NOx/soot variations can have on slope based estimation (i.e., the substantial effect that extreme engine-out NOx/soot conditions can have on dP/Q based soot load estimates).

To further demonstrate this effect, dP/Q based soot load estimates were generated for the test cycles, with and without applying a soot layer state correction factor, as shown and described below for the Filter A, Cycle #1, Test #3 test cycle with reference to Table 1.

TABLE 1

Soot Load Estimates with and without Correction

| # | t Hr | $R_{\Delta t}$ | $r_t$ | $\left(\frac{dP}{Q}\right)_t$ kPa/ (m³/hr) | $\left(\frac{dP}{Q}\right)_0$ kPa/ (m³/hr) | $K_t$ kPa/(m³/ hr)/(g/l) | $K_{c,t}$ | Act. SL g/l | w/o correction Est. SL g/l | w/o correction Error % | w/ correction Est. SL g/l | w/ correction Error % |
|---|---|---|---|---|---|---|---|---|---|---|---|---|
| P1 | 4.5 | 0.1 | 0.13 | 0.0263 | 0.0137 | 0.00463* | 1 | 2.76 | 2.76 | −0.1% | 2.72 | −1.3% |
| P2 | 11.2 | 0.694 | 0.676 | 0.0295 | 0.0137 | 0.00402 | 0.87 | 4.23 | 3.46 | −18.3% | 3.93 | −7.2% |
| P3 | 14.1 | 0.203 | 0.216 | 0.0537 | 0.0137 | 0.00448 | 0.97 | 8.1 | 8.75 | 8.1% | 8.92 | 10.1% |
| P4 | 21.5 | 0.939 | 0.983 | 0.0428 | 0.0137 | 0.00372 | 0.80 | 8.49 | 6.37 | −25.0% | 7.83 | −7.8% |
| P5 | 22.7 | 2.553 | 2.344 | 0.0326 | 0.0137 | 0.00236 | 0.51 | 7.78 | 4.14 | −46.8% | 8.02 | 3.1% |

*$K_0$, reference soot layer state value

As explained in detail above, instantaneous NOx/soot values were used to determine instantaneous regeneration/loading rate (R/L) ratios ($R_{\Delta t}$) at various time points (e.g., at each point P1-P5). A weighted ratio of R/L ($r_t$) at each point was determined utilizing equation [2], wherein for the illustrative calculations $\alpha=1$ $hr^{-1}$, $\Delta t=\frac{1}{2}$ for Cycle #1 and $\Delta t=\frac{1}{3}$ for Cycle #2. A soot layer state parameter ($K_t$) at various points was then determined using experimentally measured $(dP/Q)_t$, $(dP/Q)_0$, and soot load (SL) values utilizing equation [1].

As illustrated in FIG. 7, to determine a linearly fitted form of equation [4], $K_t$ was plotted as a function of $r_t$. For the illustrative data points of FIG. 7, the fitted equation for $K_t$ as a function of $r_t$ was determined as $K_t=0.0047-0.001*r_t$. Using the fitted form of equation [4], $K_t$ values at any given time t could then be calculated, and a soot layer state correction factor ($K_{c,t}$) was calculated for each time point utilizing equation [6].

As shown in Table 1, soot load estimates (Est. SL) were calculated utilizing equations [5], wherein $K_t$ was held constant at $K_t=K_0$ (i.e., w/o correction), and [7], wherein $K_{c,t}$ was applied to $K_0$ (i.e., w/correction). The soot load estimates at each point were then compared to actual soot load measurements (Act. SL) at each point. For the Filter A, Cycle #1, Test #3 test cycle, the error between each estimate and measurement is shown in Table 1. As illustrated in Table 1, the soot load estimates w/correction generally show an improvement over the soot load estimates w/o correction, while showing a significant improvement at points with high $r_t$ values (i.e., under high engine-out conditions). Furthermore, when considering all the experimental cycles, the corrected soot load estimates were on average within an error of 18%.

Thus, the results shown in FIGS. 4-7 and Table 1 demonstrate that a pressure drop based soot load estimation approach that accounts for soot layer state changes by applying a soot layer state correction factor, in accordance with various exemplary embodiments of the present teachings, can provide enhanced accuracy over conventional pressure drop based approaches that utilize a constant soot layer state value. Accordingly, systems and methods for estimating soot load in a particulate filter in accordance with the present teachings, can be implemented to accurately estimate the soot load in a particulate filter throughout all periods of engine operation (e.g., even during extreme engine-out conditions). Those having ordinary skill in the art would understand that the operating conditions described above and the engine cycles used for the studies are exemplary only and other operating conditions and/or engine cycles may be chosen depending on various factors without departing from the present teachings.

Although various exemplary embodiments shown and described herein relate to dP/Q based pressure drop systems and methods for estimating soot load, those having ordinary skill in the art would understand that the teachings of that application provide an exemplary pressure drop soot load estimation approach and are not intended to limit the present teachings or the claims. Those having ordinary skill in the art would, therefore, understand that the systems and methods of the present teachings contemplate applying a correction to any pressure drop based soot load estimation system and/or method (e.g., lookup table based or model based). In other words, the correction strategy disclosed in the exemplary embodiments of the present teachings is intended to be independent of the pressure drop based estimation approach used.

Furthermore, although various exemplary embodiments shown and described herein relate to a system and method for estimating soot load of a particulate filter used in an automobile exhaust gas treatment system, those having ordinary skill in the art would understand that the methodology and systems described may have a broad range of application to particulate filters useful in a variety of applications, including, but not limited to, coal combustion processes, various other internal combustion engines, stationary and non-stationary, and other particulate filtration applications for which determining when regeneration should occur may be desirable. Ordinarily skilled artisans would understand how to modify the exemplary systems and methods described herein to estimate particulate load of a particulate filter used in an application other than an automotive application.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It should be understood that while the invention has been described in detail with respect to certain exemplary embodiments thereof, it should not be considered limited to such, as numerous modifications are possible without departing from the broad scope of the appended claims.

We claim:

1. A method for regenerating a particulate filter, comprising:
    calculating a soot layer state correction factor based on a rate of regeneration and a rate of particulate loading in the particulate filter;
    calculating an estimated soot load in the particulate filter based on a pressure drop of an exhaust gas flowing through the particulate filter and the calculated soot layer state correction factor; and
    causing regeneration of the particulate filter when the estimated soot load is greater than or equal to a threshold value;
    wherein calculating the soot layer state correction factor comprises determining a soot layer state parameter; and
    wherein determining the soot layer state parameter comprises calculating a ratio of the rate of regeneration to the rate of particulate loading in the particulate filter.

2. The method of claim 1, wherein determining the soot layer state parameter further comprises determining an engine NOx emission and an engine particulate matter emission.

3. The method of claim 2, wherein determining the engine NOx emission and the engine particulate matter emission comprises sensing the engine NOx emission and/or the engine particulate matter emission and/or using model based look-up tables for the engine NOx emission and/or the engine particulate matter emission.

4. The method of claim 2, wherein determining the soot layer state parameter further comprises calculating a ratio of the engine NOx emission to the engine particulate matter emission.

5. The method of claim 4, wherein calculating the ratio of the engine NOx emission to the engine particulate matter emission comprises calculating a weighted ratio of the engine NOx emission to the engine particulate matter emission.

6. The method of claim 5, wherein calculating the weighted ratio of the engine NOx emission to the engine particulate matter emission comprises calculating a weighted ratio of the engine NOx emission to an engine soot emission.

7. The method of claim 2, wherein determining the soot layer state parameter further comprises determining a temperature and a flow rate of the exhaust gas flowing through the particulate filter.

8. The method of claim 7, wherein determining the temperature and the flow rate comprises sensing the temperature and the flow rate of the exhaust gas flowing through the particulate filter.

9. The method of claim 2, wherein calculating the soot layer state parameter further comprises determining an engine load.

10. The method of claim 1, wherein calculating the ratio of the rate of regeneration to the rate of particulate loading comprises calculating a weighted ratio of the rate of regeneration to the rate of particulate loading in the particulate filter.

11. The method of claim 10, wherein calculating the weighted ratio of the rate of regeneration to the rate of particulate loading comprises calculating a weighted ratio of the rate of regeneration to a rate of soot loading in the particulate filter.

12. The method of claim 1, wherein calculating the estimated soot load comprises determining a temperature, a flow rate, and a pressure drop of the exhaust gas flowing through the particulate filter.

13. The method of claim 12, wherein calculating the estimated soot load further comprises determining a ratio of the pressure drop to the flow rate.

14. The method of claim 12, wherein calculating the estimated soot load further comprises determining a total pressure drop of the exhaust gas flowing through the particulate filter.

15. The method of claim 14, wherein determining the total pressure drop of the exhaust gas comprises determining inlet contraction losses, outlet expansion losses, inlet channel losses, outlet channel losses and permeable layer losses of the exhaust gas.

16. The method of claim 1, wherein causing the regeneration of the particulate filter comprises causing the regeneration of a particulate filter in an engine exhaust gas aftertreatment system comprising one or more components for treating exhaust gas disposed in a flow path of the exhaust gas between the engine and the particulate filter.

17. A method for regenerating a particulate filter, the method comprising:
   determining an engine NOx emission, an engine particulate matter emission and a temperature, a flow rate, and a pressure drop of an exhaust gas flowing through the particulate filter;
   determining a soot layer state parameter based on at least the engine NOx emission and the engine particulate matter emission;
   calculating a soot load estimate based on the pressure drop and the soot layer state parameter; and
   causing regeneration of the particulate filter when the soot load estimate is greater than or equal to a threshold value;
   wherein determining the soot layer state parameter comprises calculating a ratio of the engine NOx emission to the engine particulate matter emission.

18. The method of claim 17, wherein determining the engine NOx emission, the engine particulate matter emission and the temperature, the flow rate, and the pressure drop comprises sensing the engine NOx emission, the engine particulate matter emission and the temperature, the flow rate, and the pressure drop and/or using model based look-up tables for the engine NOx emission and/or the engine particulate matter emission.

19. The method of claim 17, further comprising calculating a soot layer state correction factor based on the soot layer state parameter and a soot layer state reference value.

20. The method of claim 19, wherein calculating the soot load estimate comprises applying the soot layer state correction factor to the soot load estimate.

21. The method of claim 17, wherein determining the soot layer state parameter comprises calculating a ratio of a rate of regeneration to a rate of particulate loading.

22. The method of claim 21, wherein calculating the ratio of the rate of regeneration to the rate of particulate loading comprises calculating a weighted ratio of the rate of regeneration to the rate of particulate loading.

23. The method of claim 22, wherein calculating the weighted ratio comprises calculating the weighted ratio at the particulate filter, wherein the exhaust gas is altered between an engine and the particulate filter.

24. The method of claim 17, wherein calculating the ratio of the engine NOx emission to the engine particulate matter emission comprises calculating a weighted ratio of the engine NOx emission to the engine particulate matter emission.

25. A system for estimating soot load in a particulate filter, comprising:
   a temperature sensor, a pressure drop sensor, and at least one engine sensor;
   a NOx sensor and/or a soot sensor; and
   at least one controller configured to receive signals from the temperature sensor, the pressure drop sensor, and the at least one engine sensor, and dynamically estimate a soot layer state correction factor and a pressure drop based soot load based on the signals,
   wherein the controller is configured to estimate the soot layer state correction factor based on a ratio of a rate of regeneration to a rate of particulate loading in the particulate filter and control regeneration of the particulate filter based on the pressure drop based soot load.

26. The system of claim 25, further comprising a flow rate sensor.

27. The system of claim 25, wherein the at least one controller is configured to generate at least one response signal causing regeneration of the particulate filter when the pressure drop based soot load is greater than or equal to a threshold value.

* * * * *